UNITED STATES PATENT OFFICE.

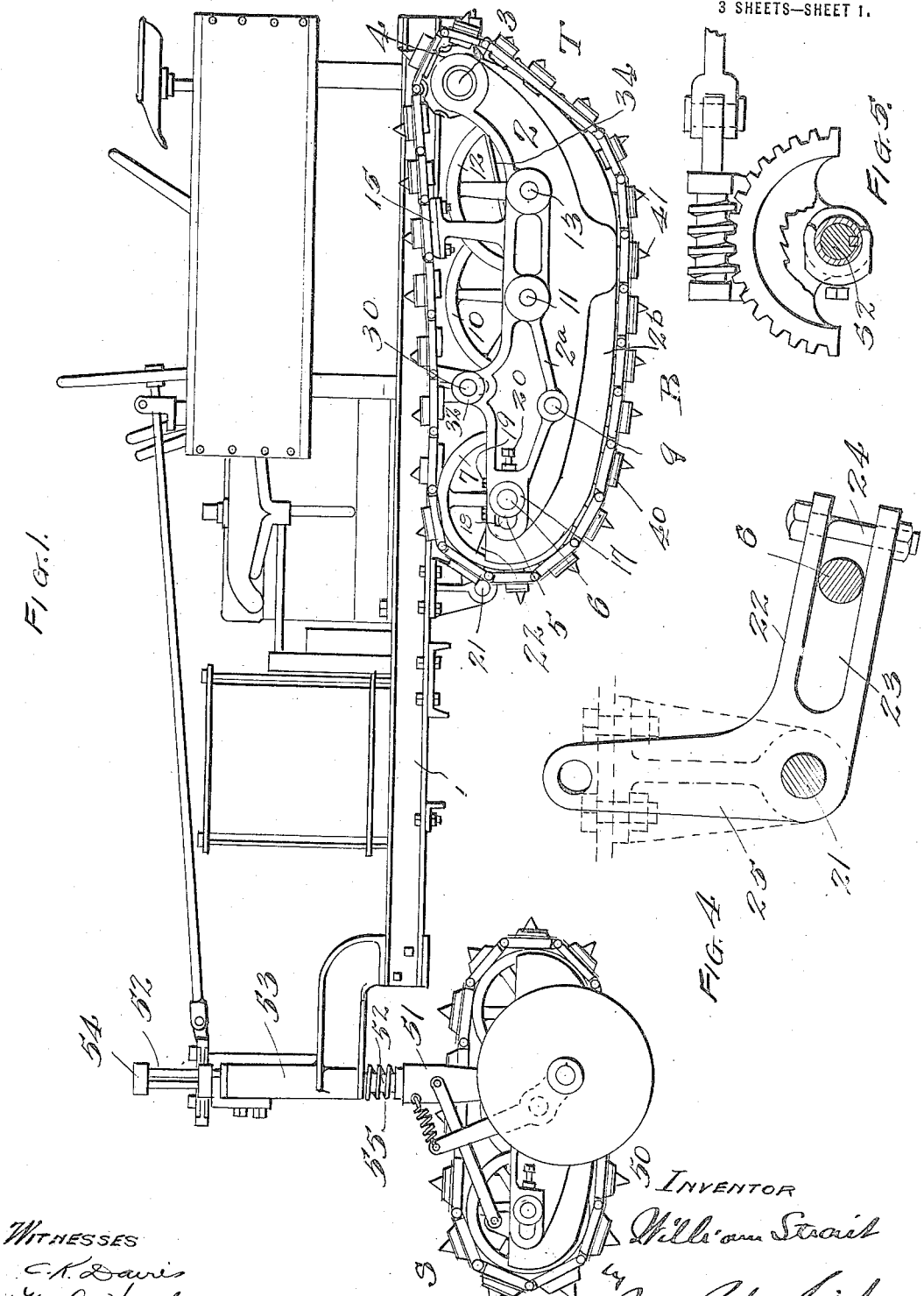

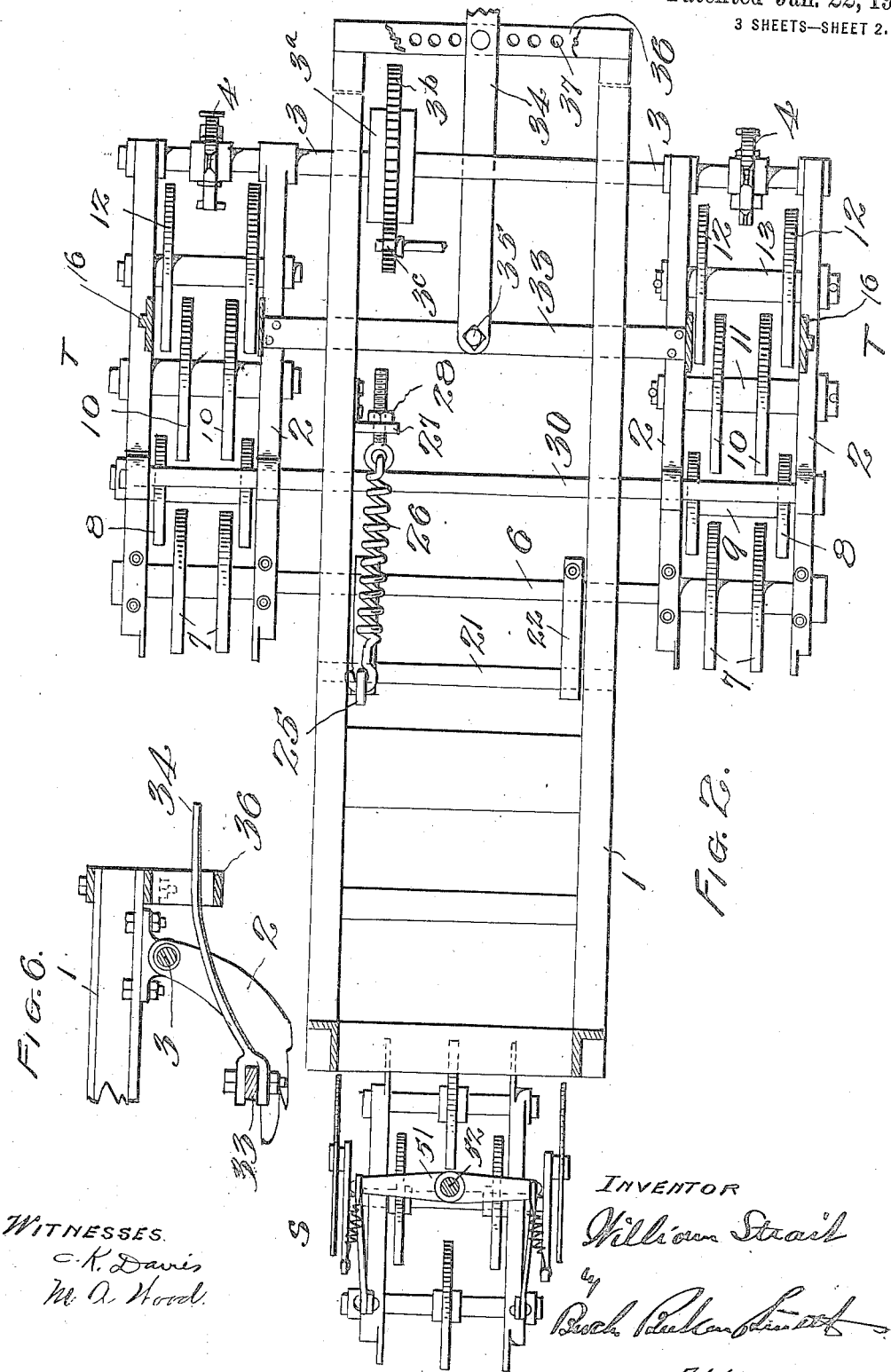

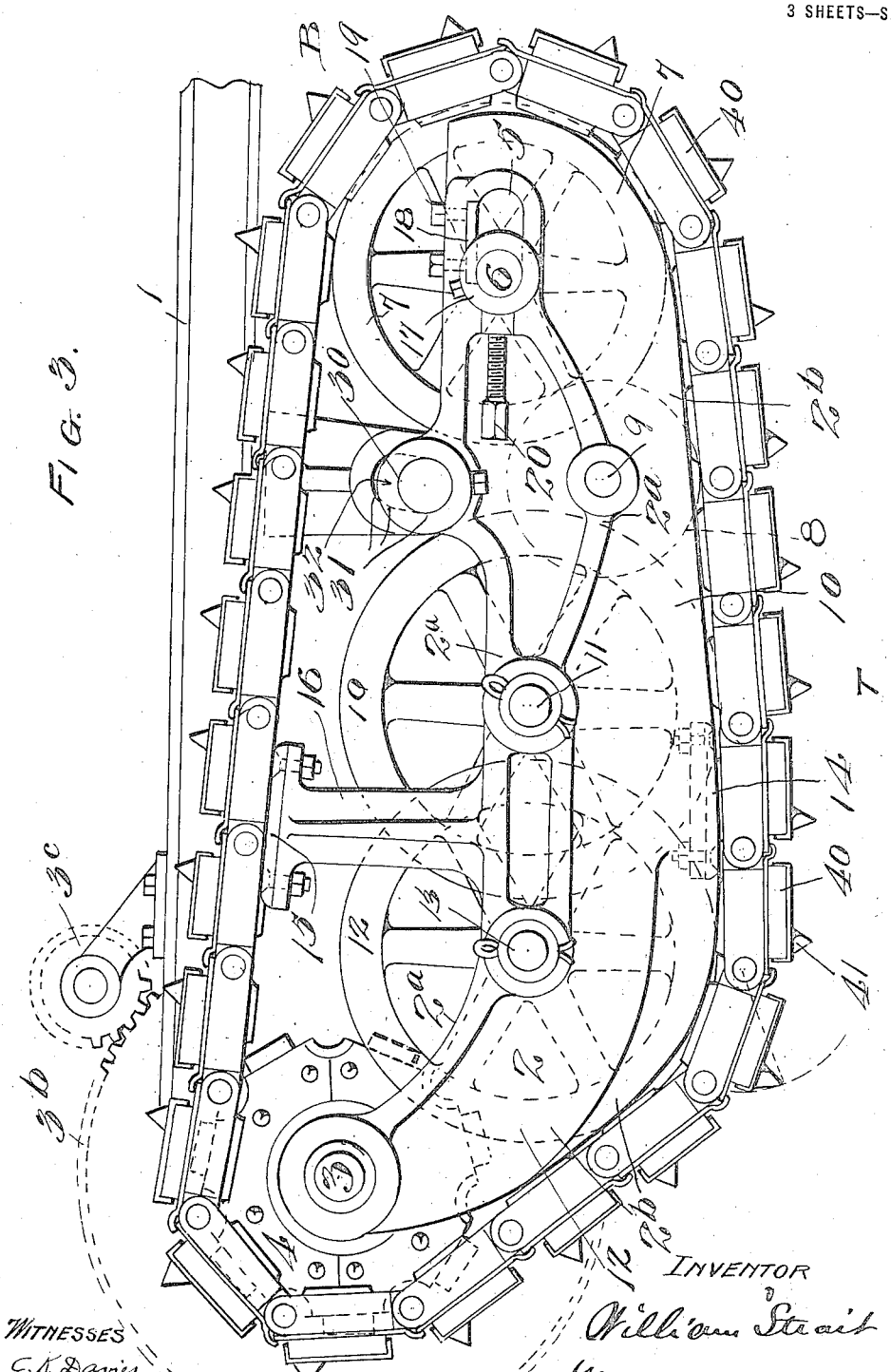

WILLIAM STRAIT, OF APPLETON, WISCONSIN.

TRACTION-MACHINE.

1,254,446.

Specification of Letters Patent.    Patented Jan. 22, 1918.

Application filed July 7, 1914. Serial No. 849,602.

*To all whom it may concern:*

Be it known that I, WILLIAM STRAIT, a citizen of the United States, residing at Appleton, in the county of Outagamie and State of Wisconsin, have invented new and useful Improvements in Traction-Machines, of which the following is a specification.

Among the principal objects of the invention are to provide improvements in the tractor units, in the steering means, and especially in steering tractors, in the spring suspension, in the mode of connecting the tractor units when two are used for driving, and in connecting them with the main frame; also in the arrangement of the draft mechanism.

The nature and advantages of the invention will be further described so far as is necessary in connection with the detailed description of the accompanying drawing which shows one exemplification of the invention. It is to be understood that the invention is capable of embodiment in many different forms, and I do not limit myself to details except as claimed hereafter.

Figure 1 is a side elevation;

Fig. 2 a top plan;

Fig. 3 an enlarged side elevation of one of the traction units;

Fig. 4 an enlarged detail of the spring suspension; and

Fig. 5 is a top plan detail of the steering gear.

Fig. 6 is a detail of the draft mechanism.

Reference character 1 designates a main frame at each side of which, near the rear, is a tractor unit T. At the front end is a steering unit S.

Each of the tractor units has two side bars or frame members 2. These are upwardly curved at their rear ends and pivotally mounted upon drive shaft 3 which is mounted in rigid bearings in the main frame and provides a pivotal and driving support for each of the tractor units. Each tractor has upon the driving shaft and between its side bars 2 a drive sprocket 4, preferably of noticeably small diameter, and, by reason of its location in the tractor frame, elevated high above the ground, so that its bottom is away off the ground and its shaft 3, as clearly seen in Figs. 1 and 3, is highly elevated. On the drive shaft, as best seen in Figs. 2 and 3, is suitable differential gearing carried in a housing $3^a$ and this is driven by a large gear $3^b$, usually mounted on the differential housing, and the gear is in turn driven by a small pinion $3^c$ impelled by the engine through any suitable transmission mechanism, which will usually include change speed devices. The gear $3^b$ and pinion $3^c$ will sometimes be spur gears, as shown, but in some cases they might be bevel gears or worm gears. The elevation of drive shaft 3 permits driving gear $3^b$ to be made of large diameter. By this arrangement the gear may easily be made larger than drive sprockets 4 and it may be made very much larger than these sprockets, as clearly shown in Fig. 3, without undesirably reducing the ground clearance below the gear. In connection with the elevated position of the shaft and the large drive gear, when the sprockets 4 are made of noticeably small diameter as shown, a powerful gear reduction in the driving mechanism is easily obtained in a very advantageous way. By making the spur gear $3^b$ of large diameter and the sprockets of small diameter, a substantial reduction is obtained, as between the gear and the tractor belts, and at the same time another substantial reduction is obtained between pinion $3^c$ and the gear. This ample gear reduction afforded between the pinion and the belt gives much greater latitude in the design of the transmission gear or other reduction devices that may be employed between the engine and the pinion and permits the necessary total reduction to be obtained without providing inconveniently large reductions between the engine and pinions $3^c$. At their front ends the frame members carry in slots 5 a front or idler shaft 6. This extends across the machine and serves for both tractors and upon it in each tractor unit are mounted between the frame members idler pulleys 7. The belt B is supported mainly by the driving sprocket and the front idlers, but in addition there are intermediate idlers 8 on a shaft 9, idlers 10 on the shaft 11, and idlers 12 on a shaft 13. These idlers run upon the inside of the lower stretch of the belt and maintain the lower portion in proper contact with the ground, and also maintain the belt in its desired form or contour. This is important. As shown best in Fig. 3, the bottom stretch of the belt, by which is understood the entire front of the belt between and below the front idlers and the driving sprocket, has a markedly defined convexity or downward bulge or curvature. The exact shape of this part of the belt may vary, the principal requirement being that it shall be appreciably bulged or convexed. In a preferred form the lower stretch of the belt may be considered to consist of two portions extending from the bottoms of the front idlers 7 to a point below or slightly to the rear of the axis of rear idlers 12. This part of the belt may in some cases be designated as the ground stretch and it is preferably slightly, or more or less, bulged or convexedly curved, as clearly shown in Fig. 3. The part of the belt from about the rear idlers 12 to its point of engagement with the driving sprocket 4 has a sharp upward angle and is usually substantially straight, and in fact in most cases this part of the belt (which may be called for identification the rear stretch) may be unsupported and its shape results from the driving pull on the sprocket. In one embodiment, as shown, about three links of the belt between the sprocket and the rear idlers will lie in a substantially straight line.

Portions of the lower stretch of the belt may be supported in addition to the support provided by the idlers. For example, the frame members may be provided with runners or shoes 14 engaging inner surfaces of the belt links and these serve to support the belt and hold it in proper form in such cases, for example, as the application of heavy load between idlers 10 and 12. These shoes or runners may be suitably lubricated so that little friction is caused when they engage the belt under load. A portion of the upper stretch of the belt may be supported by shoes or runners 15 and these may be of hardened metal separably connected to support 16 carried by frame members 2.

The front shaft 6 preferably is provided with bushings 17 slotted to engage the top and bottom of frame slots 5. The loose keys or clamping members 18 are provided at one side of the frame slots and by means of set screws 19 these may be forced down to engage bushings 17 and hold the shaft securely in position after it has been adjusted by means of set-screws 20 located in the frame members and bearing against the bushings in a longitudinal direction.

The tractor units are to be spring supported in the preferred construction and for this purpose a shaft 21 (see Fig. 2) is mounted in suitable bearings in the main frame. These carry two arms 22 (see Fig. 4) and in these arms are slots 23 embracing front shaft 6. The slots are closed at the rear ends by means of bolts 24. The shaft 21 is also provided with another arm 25 and to this is connected one end of spring 26. The rear end of the spring is held by a lug 27 on the frame and the tension of the spring is adjustable by means of a nut 28 or other suitable device. The tension of the spring exerted upon shaft 21 urges arms 22 downward and thus shaft 6 and the front ends of the tractor units are flexibly urged downward in relation to the main frame.

The tractor units are laterally supported and guided in their oscillations by a guide bar 30 mounted on the main frame and extending through guide slots 31 provided in the tractor frame members. On the bar outside the outer tractor frame members and inside the inner frame members are bushings 32 which prevent lateral movement of the tractor units or limit the movement to the extent desired. By providing guiding devices and separate spring means for the tractors the spring mechanism may be such as to permit the full vertical play of the tractors and the capacity of the springs is not limited in any way by combining them with the guides, as has been done in some previous cases.

Draft mechanism is connected not to the main frame but to the tractors, as follows: The transverse bar 33 is connected at each end to the inner tractor frame members and this bar is below and independent of the main frame and also below the pivot axis 3 of the tractor units. To this near the center is connected draw bar 34, and this may be pivoted if desired at 35. The draw bar may rest on a transverse rail 36 provided at the rear of the main frame. The transverse rail may have holes 37 and pins passing through these holes may in some cases serve either to locate the draw-bar rigidly in relation to the main frame or to connect a load to the main frame if that is desired. Ordinarily, however, the draw-bar would be free of the main frame except for resting upon rail 36; it preferably lies below the pivot axis 3 of the tractors and is free to swing laterally to accommodate the pull on the load to the direction of motion of the machine. In short, the draft line preferably is below the pivot axis of the tractors and in this way when a load is applied, the load reaction tends to draw down the forward ends of the tractors and to increase the amount of contact with the ground, and this effect is proportional to the load. The greater depression of the front ends of the tractors increases ground contact by reason of the peculiar shape of the lower stretch of the belts which ordinarily, or when the load is light, engage the ground through only one or two, or a few, of the links near the rear end of the ground stretch, but when the load is heavy and the front ends move down more of the links engage and at the same time the ground contact center shifts in the longitudinal direction of the belt.

Otherwise described, and with respect to one embodiment of the invention, it may be said that the ground stretch of the belt has a varying curvature, this curvature being relatively sharp below the rear idlers and the normal or light ground contact will be adjacent to this point; the curvature is more gradual and may be increasingly more gradual from this point forward and thus, as the front ends of the units are depressed for any reason, the ground bearing center shifts forward and the contact area at the same times increases.

The present construction differs from some of my previous disclosures, among other things, in accentuating the curvature of the ground stretch at or about the rear idlers or shortly in front of the drive sprockets; in making the sprockets relatively smaller and in elevating them more decidedly above the ground and, incidentally, in bringing sharply up and away from the ground and making substantially straight the rear stretch of the belt or part between the sprockets and the ground. The small size of the sprockets and the elevated position of the shaft 3 permits a satisfactorily large drive gear and differential mechanism to be used on the shaft without decreasing the ground clearance and at the same time the problem of necessary gear reduction between the engine and the belts is greatly simplified because a great reduction is afforded by the drive sprockets 4 and other reductions in the driving line need not be so great.

By providing a normal ground contact a short distance in front of the pivot axis 3 there is at the same time provided a long overhanging front tractor structure the weight of which is greater than that of the rear part and in this way a leverage is created in which the fulcrum is at the ground contact to support the main frame in flexible balance, and where the relative weights are suitable the tractor units will thus support the main frame flexibly without any spring mechanism. The spring mechanism previously described will, however, be used in many cases and when used will supplement the balancing action of the tractor units in an obvious way.

The belt tread blocks 40 are preferably provided with ground contact spikes 41 and these are preferably made of conical or approximately conical form, as shown, and are preferably located at or near the rear edges of the tread blocks. By this arrangement it will be clearly understood (see Fig. 3) that after the spikes have sunk into the ground and as in the travel of the machine they approach the point where they are to be raised, these spikes move in the arc of a circle struck from the forward pivot center of their length, this arc being indicated by dotted lines in Fig. 3. The path of this arc, it will be observed, is such that the spikes lift clean out of the holes they have formed without having to displace earth. By the ordinary arrangement of spikes, or tread flanges, these are compelled when leaving the ground to displace a considerable amount of earth laterally and the energy required to do this absorbs an appreciable and objectionable part of the output of the motor. By my arrangement the additional power required to move the spikes from the grou . is not appreciable, although at the same time a very effective ground contact is obtained. The advantage of this feature is emphasized in cases where the machine is used over ice or stone or frozen roads where the resistance to clearing ordinary ground contact pieces is very much increased.

The front or steering support is in a preferred form of the invention a tractor as shown in Fig. 1. This has a curved convex ground stretch 50 and is suitably supported by pulleys or the like, the details of which will not be here described. The tractor unit is carried by a fork 51 provided with a stem 52 pivotally mounted in a vertical bearing 53 on the main frame and arranged to slide vertically therein, the outer movement of the stem being limited by a collar 54. A large degree of vertical movement is provided for so that, for instance, if the front end of the machine runs over a depression the steering tractor will immediately drop into it and maintain steering contact with the ground, whether the front end of the main frame drops or not, or before it drops. A spring means, such as spring 55, placed about stem 52 serves to cushion the front end of the machine when the steering tractor is in normal position, but this spring need not be of such length that it will exert any cushioning effect when the tractor is dropped very much below the position shown in Fig. 1. Further details of the steering mechanism are not described herein, but are made a part of a separate application.

The tractor frame members 2 are provided with stiffening ribs 2$^a$ suitably designed to give proper support for the various bearings and bars connected to the frames and to provide necessary vertical and lateral stiffness, and the frame members are also provided with webs 2$^b$ preferably cast integral with the frames, and the lower end contours of these webs conform with the inner line of the belt. In this way an effective guard is provided extending over so much of the inner and outer faces of the tractor units as is necessary to prevent entrance of dirt.

In addition to the advantages of the small sprockets previously described, it should be mentioned that these small sprockets with ample bearing surfaces for the chain have the additional advantage of engaging only a small part of the chain at one time. In the particular embodiment shown, only three links of the chain engage the sprocket at once. For this reason, even after the chain is greatly worn and its pitched length increased, it will still coöperate with the sprocket satisfactorily, because the total increase in pitched length of the parts of the chain in engagement with the sprocket is not sufficient to interfere with proper engagement.

The idler pulleys 7, 10, 12, have their journals 6, 11, 13, located high in the tractor frame or near the top of the frame members. In this way the pulleys are made very large and will, therefore, last proportionately longer in spite of wear than if they were made smaller. The elevation of the driving sprocket also causes the upper stretch of the belt to run more or less on an incline, which reduces, to a certain extent, the pressure of the chain on its supporting device 15. This reduces friction and wear in an obvious way.

Reference is herewith made to my copending applications Serial Number 769,622, filed May 24, 1913; Serial Number 805,767, filed December 10, 1913; Serial Number 849604, filed July 7, 1914, all for tractor mechanism.

I claim:

1. In a traction machine, the combination of a main frame, a driving tractor pivoted thereto at each side near the rear, and a spring-supported steering unit pivotally mounted in the main frame near the front.

2. In a traction machine, the combination of a main frame, driving tractors, one pivoted at each side of the main frame near the rear, spring means intermediate the driving tractors and the frame, a steering tractor, a pivotal mounting therefor in the main frame, and spring means intermediate the steering tractor and the frame.

3. In a traction machine, the combination of a main frame, a drive shaft therein, tractor frame members pivoted thereon, a belt carried by the tractor frame members, guide means intermediate the main frame and the tractor frame to laterally brace the tractor, and spring means intermediate the main frame and tractor frame and independent of the guide means.

4. In a traction machine, the combination of a main frame, two tractor frames pivoted thereon and provided with guide slots, and a lateral brace shaft carried by the tractor frame and having means coöperating with the slots to brace the tractors laterally and permit vertical motion.

5. In a traction machine, the combination of a main frame, a drive shaft thereon, two tractor frames pivoted on said shaft, idler pulleys forwardly mounted in the tractor frames, and a transverse shaft connected to both of the tractor frames and carrying said idler pulleys.

6. In a traction machine, the combination of a main frame, two tractor frames pivoted thereon and connected rigidly together, and spring-supporting means common to said tractors for supporting them flexibly in relation to the main frame.

7. In a traction machine, the combination of a main frame, two tractor frames pivoted thereon and connected rigidly together, and adjustable spring-supporting means common to said tractors for supporting them flexibly in relation to the main frame.

8. In a traction machine, the combination of tractor frame members, belt pulleys therein, a shaft for said pulleys adjustably mounted in slots in the frame members, a clamping key carried by one of the frame members and means for engaging the key with the shaft to hold the same in adjusted position.

9. In a traction machine, the combination of a tractor frame, front and rear belt pulleys carried thereby, a belt passing around the pulleys and a shoe or runner connected to the frame and engaging the upper stretch of the belt to support the same.

10. In a traction machine, the combination of a tractor frame, front and rear belt pulleys carried thereby, a belt passing around the pulleys and a detachable shoe or runner connected to the frame and engaging the upper stretch of the belt to support the same.

11. In a traction machine, the combination of a tractor frame, front and rear belt pulleys therein, a belt passing around the pulleys, intermediate idler pulleys to support the ground stretch of the belt, and a shoe or runner supported by the frame and engaging the ground stretch of the belt between certain of said pulleys.

12. In a traction machine, the combination of a tractor frame, main belt pulleys therein, a belt composed of blocks linked together passing around the pulleys, a guide pulley located below the bottoms of the main pulleys and substantially at the normal ground contact point of the belt, and substantially conical ground spikes carried by the belt blocks near the rear ends thereof.

13. In a traction machine, the combination of a main frame, a tractor frame pivoted thereon, and a belt carried by the tractor frame and having a curved ground stretch and a substantially straight upwardly extending rear stretch.

14. In a traction machine, the combination of a main frame, a tractor frame pivoted thereon, and a belt carried by the tractor frame, and a belt having a moderately convex ground stretch, a relatively sharply curved portion at the rear end of the ground stretch, and a rear portion extending sharply upward.

15. In a traction machine, the combination of a main frame, a tractor frame pivoted thereon, and a belt carried by the tractor frame, the lower stretch of the belt having a sharply convex fulcrum point a short distance in front of the pivot axis, a substantially straight upwardly directed portion to the rear thereof, and a forward portion lying substantially parallel to the ground for a considerable distance in front of said fulcrum point.

16. In a traction machine, the combination of a main frame, a drive shaft thereon, a drive sprocket of small diameter on the shaft, a tractor frame having upcurved rear portions pivoted on the shaft, a front idler pulley carried by the tractor frame, a rear idler pulley having its bottom away below a line drawn between the bottoms of the sprocket and front idler, and a belt passing around the sprocket and idlers.

17. In a traction machine, the combination of a main frame, a drive shaft, a sprocket thereon, a tractor frame pivoted on the shaft, a tractor belt carried by the frame and means for maintaining the belt in approximately triangular shape, with one of its apexes normally engaging the ground a short distance in front of the pivot axis.

18. In a traction machine, the combination of tractor frame members, belt supporting pulleys carried thereby, a belt passing around the pulleys, frame members having rib portions to provide necessary lateral and vertical stiffness, and webs carried by the frame members and closing a part of the space within the belt to prevent entrance of dirt.

19. In a traction machine, the combination of tractor frame members, belt supporting pulleys carried thereby, a belt passing around the pulleys, frame members having rib portions to provide necessary lateral and vertical stiffness, and webs integral with the frame members carried by the frame members and closing a part of the space within the belt to prevent entrance of dirt.

20. In a traction machine, the combination of a main frame, a drive shaft thereon elevated well above the ground, a drive sprocket of small diameter on the shaft, a drive gear of larger diameter on the shaft, means for driving the gear, a tractor frame pivoted adjacent to the shaft axis, and a belt supported by the frame and engaged by the sprocket.

21. In a traction machine, the combination of a main frame, a drive shaft thereon located high above the ground, a tractor frame pivoted adjacent to the shaft axis, a belt thereon having a normal ground contact much below said shaft, a sprocket of small diameter carried by the shaft and engaging the belt, a drive gear on the shaft of relatively large diameter and a small drive pinion for the gear carried by the frame, whereby the gear is driven at a reduced speed and this motion is communicated by the sprocket to the belt at a much further reduced speed.

22. In a traction machine, the combination of a main frame, a driving tractor flexibly mounted thereon near the rear, a steering fork pivotally mounted on the main frame near the front, a steering tractor belt carried by the fork and spring means intermediate the tractor belt and main frame.

23. In a traction machine, the combination of a tractor frame, belt carrying pulleys thereon, a linked belt passing around the pulleys, a guide pulley located below the bottom of the main pulleys and substantially at the normal rearward ground contact point of the belt and ground engaging projections on the treads of the links, the rear faces of said projections being inclined to the links to facilitate removal of the projections from the ground.

24. In a traction machine, the combination of a tractor frame, belt carrying pulleys thereon, a linked belt passing around the pulleys, a guide pulley located below the bottom of the main pulleys and substantially at the normal rearward ground contact point of the belt and ground-engaging projections on the treads of the links near the rear edges thereof, the rear faces of said projections being inclined to the links to facilitate removal of the projections from the ground.

25. In a traction machine, the combination of a main frame, tractor belt pulleys thereon, a linked tractor belt passing about the pulleys and ground-engaging projections on the treads of the links, the rearward faces of the projections being arranged at an angle to the links to facilitate the removal of the projections from the ground.

26. In a traction machine, the combination of a main frame, a driving shaft therein, a tractor frame oscillatably connected to the main frame, ground-engaging means carried by the tractor frame, guide means intermediate the main frame and tractor frame to laterally brace the tractor unit, and spring means intermediate the main frame and tractor frame and independent of the guide means.

27. In a traction machine, the combination of a main frame, a tractor frame pivoted near one of its ends to said main frame and provided with a guide slot, and a lateral brace shaft carried by the tractor frame and having means coöperating with the slot to brace the tractor laterally and permit vertical motion of the free end of the tractor frame.

28. In a traction machine, the combination of a main frame, a tractor frame movably connected thereto, a tractor belt carried by the tractor frame and means for maintaining a downward projection in the lower stretch of said belt, and spring mechanism for the tractor frame comprising a lever fulcrumed on one of the frames and connected to the other frame, and a spring for applying spring pressure to the lever.

29. In a traction machine, the combination of a main frame, a tractor frame pivotally connected thereto, a tractor belt carried by the tractor frame and means for maintaining a downward projection in the lower stretch of said belt, a bell-crank lever fulcrumed on one of the frames and connected to the other frame and a spring connected to the lever.

30. In a traction machine, the combination of a main frame, a tractor frame pivoted in relation thereto, a tractor belt carried by the tractor frame and means for maintaining a downward projection in the lower stretch of said belt, a bell-crank fulcrumed on the main frame and engaging the free end of the tractor frame and a spring applied to the bell-crank to flexibly support the tractor frame in relation to the main frame.

31. In a traction machine, the combination of a main frame, a tractor frame pivoted in relation thereto, a tractor belt carried by the tractor frame and means for maintaining a downward projection in the lower stretch of said belt, laterally guiding means for the tractor frame, a bell-crank fulcrumed on the main frame and engaging the free end of the tractor frame, and a spring applied to the bell-crank to flexibly support the tractor frame in relation to the main frame.

WILLIAM STRAIT.

Witnesses:
  D. M. SMITH,
  M. A. WOOD.